United States Patent
Riggins et al.

(10) Patent No.: US 7,272,822 B1
(45) Date of Patent: Sep. 18, 2007

(54) AUTOMATICALLY GENERATING SOFTWARE TESTS BASED ON METADATA

(75) Inventors: Michael Riggins, San Jose, CA (US); Jeffrey Feldstein, Goleta, CA (US); Jeffrey Hewitt, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 695 days.

(21) Appl. No.: 10/246,340

(22) Filed: Sep. 17, 2002

(51) Int. Cl.
   G06F 9/44    (2006.01)
   G06F 11/00   (2006.01)

(52) U.S. Cl. ........................ 717/124; 714/38
(58) Field of Classification Search .............. 717/124, 717/127, 130; 714/38
   See application file for complete search history.

(56) References Cited

U.S. PATENT DOCUMENTS

| | | | |
|---|---|---|---|
| 5,754,755 A * | 5/1998 | Smith, Jr. ................... | 714/38 |
| 6,523,172 B1 * | 2/2003 | Martinez-Guerra et al. . | 717/143 |
| 6,620,204 B1 * | 9/2003 | Malcolm .................... | 715/513 |
| 6,772,083 B2 * | 8/2004 | Muller et al. ............... | 702/123 |
| 6,826,727 B1 * | 11/2004 | Mohr et al. ................. | 715/517 |
| 6,920,608 B1 * | 7/2005 | Davis ......................... | 715/503 |
| 6,993,747 B1 * | 1/2006 | Friedman .................... | 717/124 |
| 2002/0120919 A1 * | 8/2002 | Aizenbud-Reshef et al. .......................... | 717/127 |
| 2002/0188890 A1 * | 12/2002 | Shupps et al. ................ | 714/38 |
| 2003/0070119 A1 * | 4/2003 | Dallin ......................... | 714/38 |
| 2004/0025083 A1 * | 2/2004 | Nanja et al. .................. | 714/35 |

OTHER PUBLICATIONS

"Rational Robot Automated Test", by the Rational Company, pp. 1-14, http://web.archive.org/web/20020815182746/http://wilsonmar.com/1robot.htm, Aug. 15, 2002.*
"Controlling Web Page Access", Indiana University Webmaster, pp. 1-12, http://web.archive.org/web/20010420041619/http://www.indiana.edu/~wmhome/security_info/index.shtml.*
Tom Arnold, "A First Look: Rational RobotJ 1.0," 2002, pp. 14 pages.
Rational, "Overview," http://www.rational.com/products/robot/prodinof.jsp, printed Jan 29, 2003, pp. 1-3.

(Continued)

Primary Examiner—Wei Zhen
Assistant Examiner—Chih-Ching Chow
(74) Attorney, Agent, or Firm—Hickman Palermo Truong & Becker LLP (57) ABSTRACT

A method of automatically generating tests for a software program based on metadata that is used to control the operational behavior of a software product is disclosed. A definition is received of a page hierarchy and security characteristics associated with the software program and representing output pages that are generated by the program in operation. The definition is parsed to identify information associated with one or more pages of the program. Automatically, instructions in a test language are generated. The instructions, when executed by a testing system, cause the testing system to perform the steps of: navigating through the page hierarchy and displaying each of the pages; determining whether each of the pages is properly displayed by the program; and generating output indicating whether each of the pages is properly displayed.

34 Claims, 6 Drawing Sheets

FIG. 2B

OTHER PUBLICATIONS

Rational, "Rational Robot," 2001, 2 pages.
Mercury Interactive Corporation, Testing Java Applets and Applications, 1999, 9 pages.
Mercury Interactive Corporation, WinRunner, http://www-svca.mercuryinteractive.com/cgi-bin/display/printer_friendly.cgi, printed Jan. 29, 2003, 1 page.
Mercury Interactive Corporation, "WinRunner," 2002, 2 pages.
Mercury Interactive Corporation, "WinRunner," http://www-scva.mercuryinteractive.com/cgi-bin/display/printer_friendly.cgi, printed Jan. 29, 2003, 1 page.
Kjell Arne Barmsnes et al., "PICASSO: A User Interface Management System for Real-Time Applications," paper presented at workshop on "User Interfaces for Expert Systems", London, Mar. 11-12, 1992, pp. 1-12.

\* cited by examiner

FIG. 3
(CHECK DISPLAY)

AUTOMATICALLY GENERATING SOFTWARE TESTS BASED ON METADATA

COPYRIGHT NOTICE

This disclosure includes certain information that is copyrighted by the patent owner. The patent owner has no objection to reproduction of this patent document, as it appears in the official files of the U.S. Patent & Trademark Office, but otherwise reserves all copyright in the disclosure.

FIELD OF THE INVENTION

The present invention generally relates to testing software. The invention relates more specifically to automatically generating software tests based on metadata that is used to control the operational behavior of a software product.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Commercial software normally is subjected to testing before release to customers. In some approaches, the testing is done using automatic testing systems. In one approach, an automatic testing system is used to capture and replay a script of mouse clicks or keystrokes for the purpose of testing graphical user interface output.

Alternatively, a test engineer can prepare a custom test ("test script" herein) in a testing language, which may be a scripting language or a conventional programming language. The test scripts instruct the automatic testing system how to interact with a program under test, and how to evaluate output generated by the program under test. For example, a test script can simulate mouse clicks or keyboard interaction with a program under test, and the testing system can inform the test script whether the program under test actually has displayed a particular object on the screen. Output is generated to specify whether objects are correctly displayed or the tests are successful. Examples of commercially available testing systems that can test graphical user interfaces include Mercury Interactive WinRunner, and RobotJ from Rational Software.

However, developing test code or scripts that provide suites of automated tests for complex commercial software may involve extensive engineering time. In particular, the initial development of tests for a software product is resource-intensive, typically involving study of engineering documentation, extensive hand coding of test scripts and assembly of the scripts into test suites. When tests of application programming interfaces (APIs) are needed, extensive study of documentation and hand-written custom test programs may be needed.

After initial test development, significant ongoing effort may be needed as new features are added to a product. All such coding and development is typically manual, and there are no known industry-standard mechanisms to automatically generate test code.

Data driven software has been in use for many years throughout the software industry. In some software development approaches, metadata drives user interfaces and run-time behavior of a software program. Known Web-based network management software products use data-driven mechanisms to dynamically drive the visual representation of the user interfaces. For example, a web-based user interface development and runtime system ("Picasso") used internally at Cisco Systems, Inc. has been used to generate XML-structured data to define web-based navigation interfaces and security characteristics for commercial software products such as CiscoWorks 2000. The Picasso system consists of a SiteMap tool, which generates general navigation and security control metadata; a Content Area tool, which assists in developing application-specific logic; and a User Interface Infrastructure ("UII") runtime system, which interprets SiteMap and Content Area metadata files at runtime, and generates the visualization of web-based software products. The XML data defines a hierarchy of pages that are displayed as part of an application. Each page is assigned a unique identifier value and security level.

The UII runtime engine has a bookmarking function that can be used to directly display a particular page or screen of an application program, without traversing a hierarchical tree of pages, by providing a screen identifier of the page in a URL associated with the program.

Based on the foregoing, there is a clear need in this field for an improved way to automatically generate tests for a software program based on metadata relating to the program.

There is also a need for an improved way to automatically generate user interface tests for a software program based on an existing description of the user interface. It would be particularly useful to have an approach in which metadata defining a user interface is re-used for purposes of defining tests.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for generating software tests based on metadata that is used to control the operational behavior of a software product is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Generating Software Tests
3.0 Implementation Mechanisms-Hardware Overview
4.0 Extensions and Alternatives 1.0 General Overview The needs identified in the foregoing Background, and other needs and objects that will become apparent for the following description, are achieved in the present invention, which comprises, in one aspect, a method of automatically generating tests for a software program based on metadata describing the program. In this aspect, metadata that defines characteristics of the software program is received. The metadata is parsed to identify information associated with output of the program. A plurality of instructions in a test language is generated. The instructions, when executed by a testing system, cause the testing system to perform the following steps. The program is caused to generate program output. The program output is tested to determine if the program properly generates it. Output is generated indicating whether the program output is properly displayed. The metadata may be stored in an XML document.

In another aspect, the invention provides a method of automatically generating tests for a software program based on metadata describing the program. A definition of a page hierarchy associated with the software program is received, representing output pages that are generated by the program in operation. The definition is parsed to identify information associated with one or more pages of the program. A plurality of instructions in a test language is generated. The instructions, when executed by a testing system, cause the testing system to perform the steps of: navigating through the page hierarchy and displaying each of the pages; determining whether each of the pages is properly displayed by the program; and generating output indicating whether each of the pages is properly displayed.

In yet another aspect, the invention provides a method of generating user interface tests for a software program based on metadata describing the program, comprising the steps of: receiving a definition of a page hierarchy associated with the software program, wherein the definition comprises an Extensible Markup Language (XML) document that conforms to a Document Type Definition (DTD) defining tags that define menu levels, menu level entries, screen identifiers, and security attributes of the pages; parsing the definition to identify one or more pages of the program; and generating a plurality of instructions in a test language. The instructions, when executed by a testing system, cause the testing system to perform the steps of: navigating through the page hierarchy and displaying each of the pages using a plurality of different navigation mechanisms, wherein the navigation mechanisms are selected from among: navigating and displaying using mouse clicks; navigating and displaying using menu acceleration keys; and navigating and displaying using a direct screen display call; determining whether each of the pages is properly displayed by the program after navigation using the plurality of different navigation mechanisms; and generating output indicating whether each of the pages is properly displayed.

In other aspects, the invention encompasses a computer apparatus and a computer readable medium configured to carry out the foregoing steps.

In general, embodiments leverage data-driven mechanisms that dynamically drive the visual representation of user interfaces offered to users of a software system. For example, in one specific embodiment, XML-structured data is used in the CiscoWorks 2000 product, from Cisco Systems, Inc., to describe web-based interfaces that an end user may access. Internally, these data files contain information describing the navigational constructs used to get at a task, such as the folder in which the task is presented, the URL that is launched when the task is selected, and the security permission level associated with the task.

Using this information, extracted from the XML files associated with a product, and an understanding of the information contained in the XML file, test code is automatically generated. In one embodiment, the automatically-generated code includes:

1. Code for a test framework for the automated test of every function offered by that product without any prior knowledge on the tester's part of what functionality the product offers;
2. Code for an automated test of whether every URL defined in the XML files is actually present in the installed image of the product;
3. Code for an automated test of whether every URL defined in the XML files is performing an appropriate set of checks for the right level of user permissions to execute the URL; and
4. Code to test the product to check for new interfaces that have been added unexpectedly in subsequently released images.

These tests can be reused on all succeeding releases of a given product. Further, the process for automatically generating the tests can be reused on every application that uses similarly constructed XML files to specify an interface. Further, because the tests are automatically generated, a suite of tests can automatically evolve as a product evolves.

In one embodiment, a commercial software system is used to recognize and validate objects that are displayed in a screen display and generated using HTML or JAVA (JAVA is a trademark of Sun Microsystems, Inc.). For example, the Mercury Interactive WinRunner system or the Rational Software RobotJ system may be used. Both such systems provide a programming language with callable functions. In WinRunner the language is TSL, a Mercury Interactive specific language; the script language for RobotJ is JAVA. In embodiments using these systems, the processes described below automatically generate TSL or JAVA functions that can validate screen objects. Sequencing function calls and reporting test results are accomplished by calling the TSL or JAVA functions using a script manager.

In certain embodiments, performing the approach described herein requires prior knowledge of the structure of the XML data in the files that describe application interfaces. Based on this knowledge, a parser and automatic code generator is created.

However, in alternate embodiments, the XML data is self-describing. In these embodiments, a generalized parser may be used, so that the total process is automated even further. In these embodiments, all XML data files that describe interfaces, URLs, roles, etc., contain meta-information that abstractly defines the elements of an XML that represents the navigational components, security components, URL components, etc. Using the meta-information, a single test generator script can generate test programs for any or all conforming XML files and web-based applications.

Using the approach described in this document for a suite of related applications, it is estimated that thousands of engineer-hours of effort are saved that could be used to develop more tests for application functionality. Additionally, as products evolve and change within a given release effort or over multiple release efforts, these tests can be automatically regenerated, saving additional engineering effort.

Thus, embodiments provide a way to use the information that is delivered as part of a software product to automate the generation of tests for all or part of a software product. Data used to drive a software product's user interfaces, and other aspects of the product, can be re-used to drive the automated development of tests for the product.

2.0 Automatically Generating Tests

According to one embodiment, a software developer uses a specified set of XML tags and semantics to define the structure and behavior of a user interface of a software product. In this context, "software product" refers to any software program, system or element for which tests are automatically developed using the approaches herein. An automated test generation process uses the XML tags to generate a series of test cases for the software product.

Figure 1A:
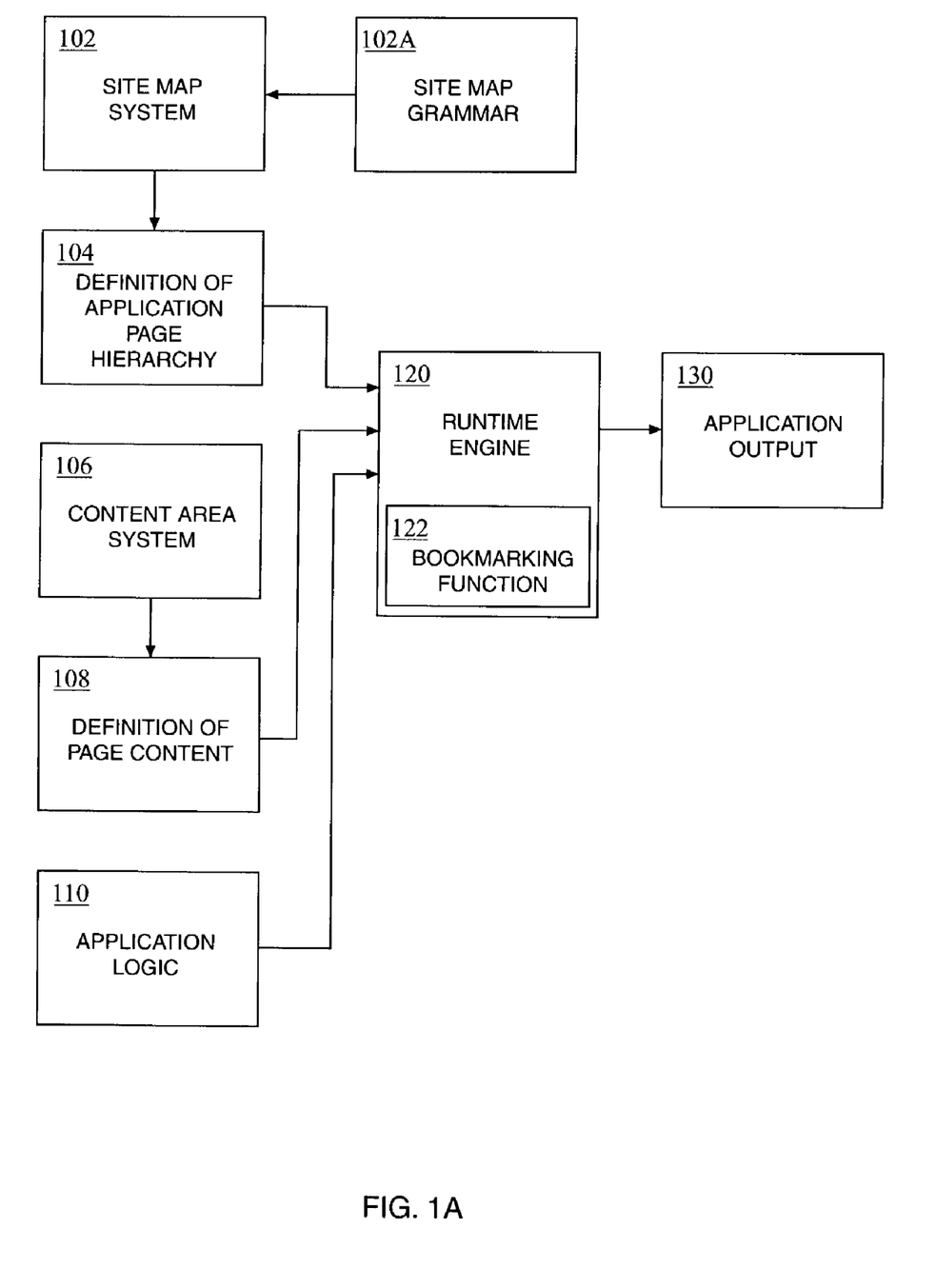
FIG. 1A is a block diagram that illustrates an overview of a system for developing and executing a data-driven software application program.

FIG. 1A is a block diagram that illustrates an overview of a system for automatically developing and executing a data-driven software application.

A site map system 102 generates a definition 104 of a page hierarchy of a software application. In this description, the terms "page" and "screen" are used synonymously to refer to visual output that is generated by a software application of interest. In certain embodiments, each page is an HTML document or Web page; however, any other form of screen display may be used. A content area system 106 generates a definition 108 of page content. Definitions 104, 108 are provided to runtime engine 120. Application logic 110 is also provided to runtime engine 120.

At run time, the definitions 104, 108 are combined with application logic 110 to result in application output 130. A bookmarking function 122, with other functions, forms part of and supports operations of runtime engine 122. Application output 130 may comprise one or more Web pages or other data that is generated in accordance with definitions 104,108.

In one embodiment, site map system 102 generates definition 104 in accordance with a site map grammar 102A. In one specific embodiment, site map grammar 102A is an Extensible Markup Language (XML) Document Type Definition (DTD), and definition 104 is generated in the form of an XML file. Appendix 1 to this description presents an example XML DTD that may be used for site map grammar 102A.

In this embodiment, definition 104 comprises a listing of all pages that comprise an application, an ordering of how the pages appear in a hierarchical menu system and the security characteristics of each page. Definition 104 also contains attributes for each page such as a unique page identifier, a reference to the content area, and a task ID. The unique page identifier (also termed a "screen ID" may be used to cause the application to generate a specific page by passing the application a URL that contains the screen ID as a parameter value. The task ID is used to perform a security authorization check for the user who is attempting to view the page.

In one specific embodiment, the structure and semantics of the XML tags are defined by a Site Map system, and specify a menu hierarchy, screen IDs, content areas, and security task IDs as specified in Table 1:

TABLE 1

XML TAGS FOR MENU HIERARCHY DEFINITION

| XML TAG | DEFINITION OF TAG |
|---|---|
| area | Menu level 1 |
| subArea | Menu level 2 |
| TOC | Menu level 3 |
| subTOC | Menu level 4 |
| areaItem | Menu level 1 entry |
| subAreaItem | Menu level 2 entry |
| TOCItem | Menu level 3 entry |
| subTOCItem | Menu level 4 entry |
| navContentArea | Content area and screen ID associated with a menu entry |
| tasks | A list of security attributes for authorization checking |
| taskID | A single security attribute |

To illustrate a clear example, Table 1 identifies tags for a maximum of four menu levels; however, in other embodiments, there may be any number of levels. To further illustrate use of the Site Map system, assume that a hypothetical application has a menu structure as set forth in Table 2:

TABLE 2

MENU STRUCTURE EXAMPLE

Trees

Evergreen

Pine
    Fir
    Spruce
  Deciduous     Maple
    Birch
    Oak
Flowers   Annual     Marigold
    Snapdragon
    Impatiens
  Perennial     Daisy
    Rose
    Petunia Based on this menu structure, site map system 102 of FIG. 1A would generate a definition 104 having the content set forth in Table 3. Thus, Table 3 presents an example of a site map XML representation of the menu structure of Table 2. In Table 3, the XML text is abbreviated to improve readability.

TABLE 3

SITE MAP XML REPRESENTATION OF MENU STRUCTURE

```
<area>
    <areaItem>Trees
        <subArea>
            <subAreaItem>Evergreen
                <TOC>
                    <TOCItem>Pine</TOCItem>
                    <TOCItem>Fir</TOCItem>
                    <TOCItem>Spruce</TOCItem>
                </TOC>
```

TABLE 3-continued

SITE MAP XML REPRESENTATION OF MENU STRUCTURE

```
          </subAreaItem>
          <subAreaItem>Deciduous
            <TOC>
              <TOCItem>Maple</TOCItem>
              <TOCItem>Birch</TOCItem>
              <TOCItem>Oak</TOCItem>
            </TOC>
          </subAreaItem>
        </areaItem>
        <areaItem>Flowers
          <subArea>
            <subAreaItem>Annual
              <TOC>
                <TOCItem>Marigold</TOCItem>
                <TOCItem>Snapdragon</TOCItem>
                <TOCItem>Impatiens</TOCItem>
              </TOC>
            </subAreaItem>
            <subAreaItem>Perennial
              <TOC>
                <TOCItem>Daisy</TOCItem>
                <TOCItem>Rose</TOCItem>
                <TOCItem>Petunia</TOCItem>
              </TOC>
            </subAreaItem>
          </areaItem>
        </area>
```

The bookmarking function 122 enables an application to display any screen defined in definition 104 directly, without navigating through the menu hierarchy. The bookmarking function is accessed by passing a screen identifier value as an argument to a root URL of the application. For example, the following URL will display screen ID 99 for application1 on a machine named myServer:

http://myServer/application1/index.jsp?screenId=99

In one embodiment, the semantics of the foregoing URL are hard-coded into automatic test generator 150 so that test scripts 154 include one or more URLs in correct form. Alternatively, a description of the semantics of a URL are defined in a separate file or metadata definition.

In one specific embodiment, network management applications are developed using a web application software framework to implement user interfaces. The framework, termed the UI Infrastructure (UII), is based on a basic screen design that divides all screens into two logical areas comprising a framework area and a content area. The framework area contains the items that are common to all application screens including a standard banner with company logo, application title, help and logout buttons, etc., and a menu system for navigation. The content area contains the application specific content and functionality.

The Picasso system includes two tools for designing user interfaces, one for specifying the information that will appear in the framework area for each screen called the site map tool, and another for creating the application specific content area layout for each screen. The output from the tools is used by a run time engine, the UII, for application deployment. The run time engine combines the static tool output with the dynamic data provided by the application logic to render the final run time application UI.

Figure 1B:
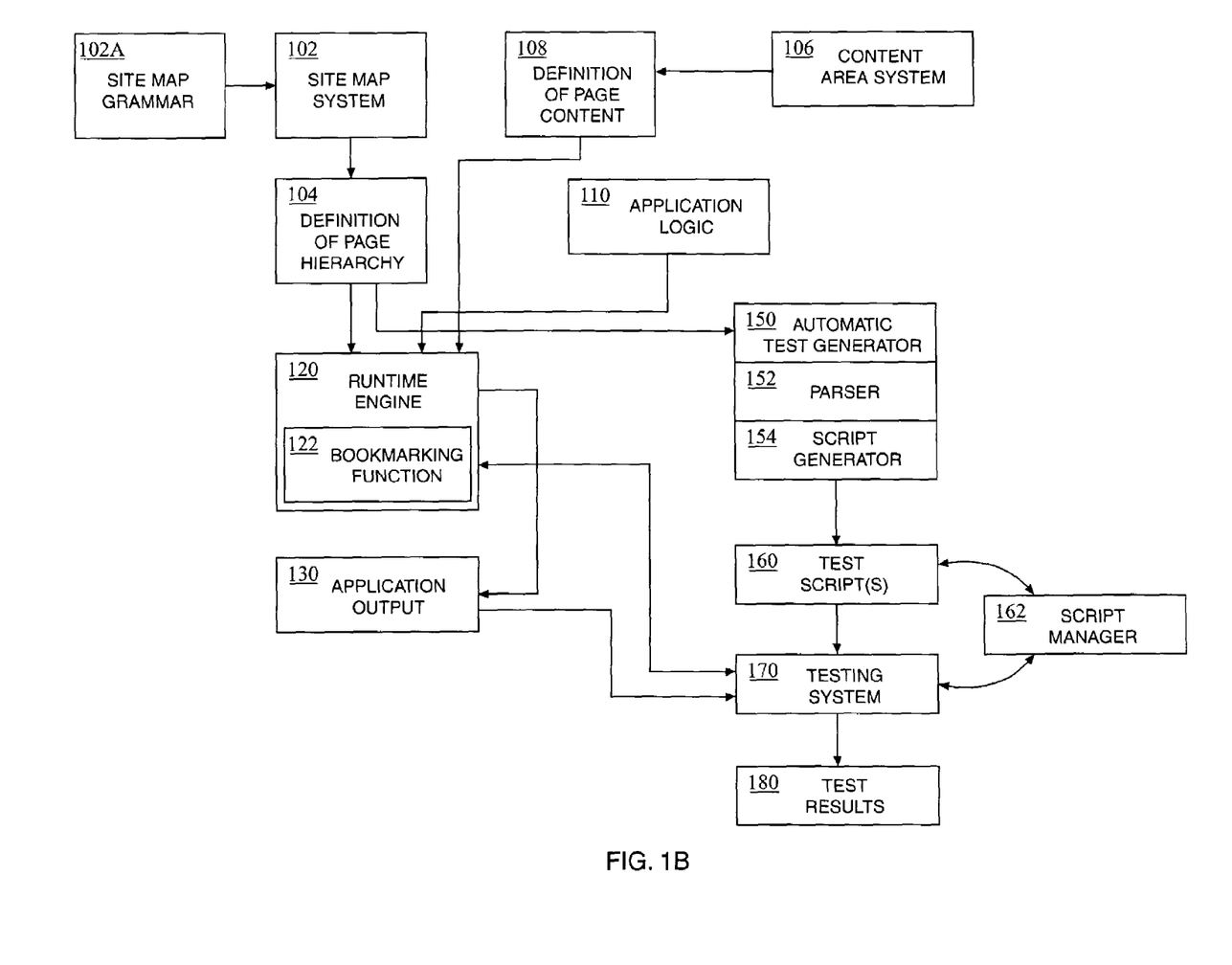
FIG. 1B is a block diagram that illustrates an overview of a system for automatically generating user interface tests.

FIG. 1B is a block diagram that illustrates an overview of a system for automatically generating user interface tests. As in FIG. 1A, a site map system generates a definition 104 of a page hierarchy, based in part on a site map grammar 102A, and a content area system 106 generates a definition 108 of page content. Definitions 104, 108 and application logic 110 are provided to a runtime engine 120 having a bookmarking function 122. At runtime, application output 130 is generated.

Further, the system of FIG. 1B includes an automatic test generator 150 having a parser 152 and script generator 154. Automatic test generator 150 can access and parse definition 104. Under control of appropriate software instructions, as described further herein, automatic test generator 150 generates one or more test scripts 160 which, when executed by a testing system 170, test the pages and screen displays of the application, based on the definition 104. The test scripts may include test script code that calls the bookmarking function 122 to generate one or more pages or screens of the application under test.

Using this approach, one or more test results 180 are generated for evaluation by test personnel or an external system. Optionally, for example, when a large plurality of test scripts 160 are generated, a script manager 162 marshals the test scripts and provides them to testing system 170, facilitating management of the testing process. In one embodiment, test generator 150 is implemented as a JAVA® program that is configured to generate test scripts 160 in a language that the testing system 170 can process.

Thus, a combination of the bookmarking function 122 of runtime engine 120 and the information in definition 104 allows automated tests to be generated for any application that uses runtime engine 120. By parsing definition 104 to create a list of screen identifier values, every screen in the application under test can be systematically accessed to check whether a valid page is successfully produced by the application. In one embodiment, tests are automatically generated to navigate to each screen by three methods:

1. Simulating mouse clicks to select the screen through the menu hierarchy;

2. Simulating the key clicks associated with the menu acceleration keys;

3. Direct navigation to an application screen.

For purposes of illustrating a clear example, the foregoing three methods are identified. However, embodiments are not limited to these methods. If there are other methods available for interacting with the program under test, then tests may be generated to interact with the program using the other methods.

In addition, security attributes for each screen are obtained from definition 104. Based on the security attributes, each application page is systematically accessed using each security attribute. This allows every application screen to be checked to ensure that an authentication error is returned if a user does not have a required security attribute.

Furthermore, frameworks for detailed testing can be generated and application-function-specific tests added to that framework to test the details of the operation of the application.

Figure 2A:
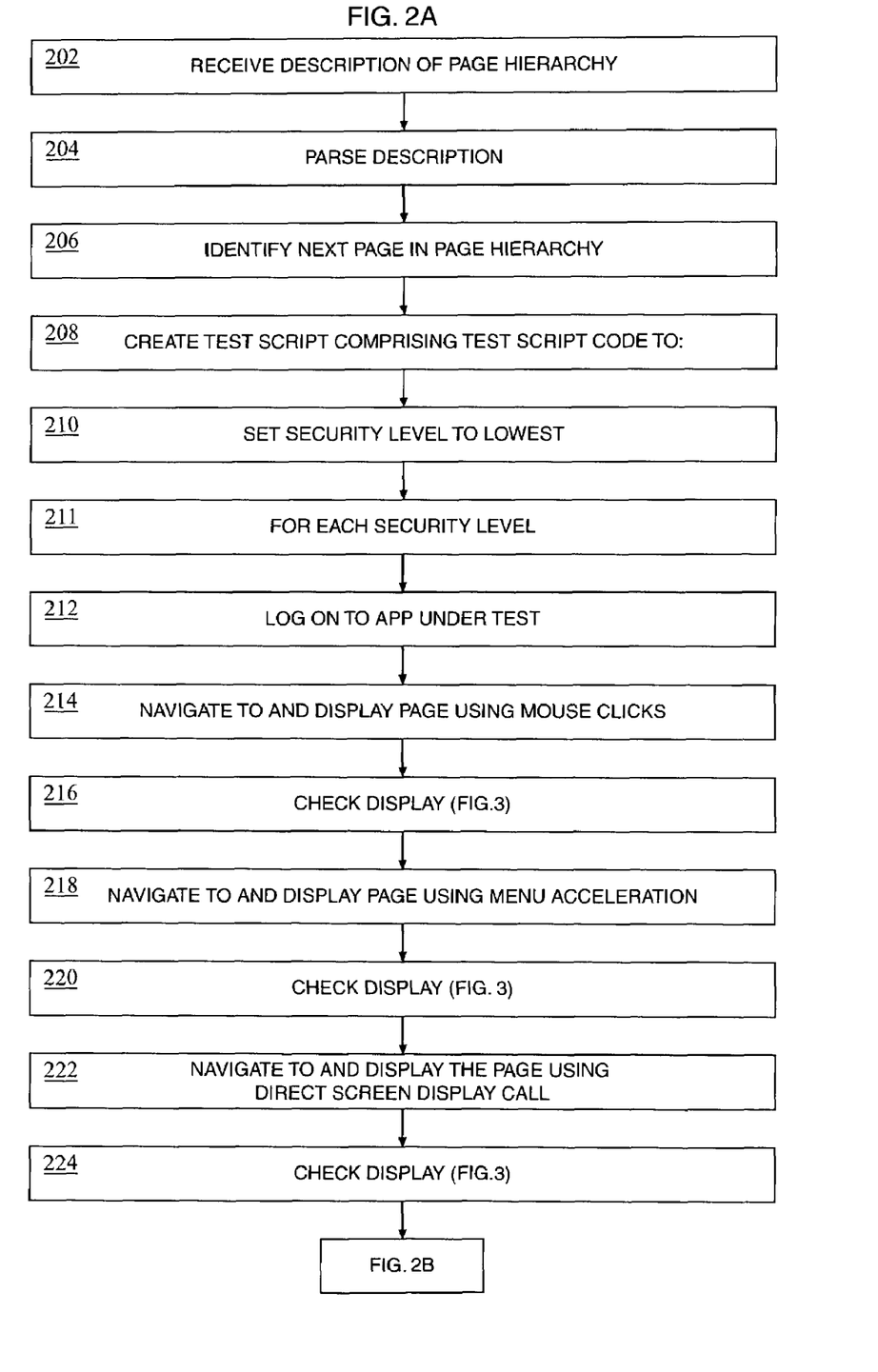
FIG. 2A is a flow diagram that illustrates one embodiment of a method for automatically generating user interface tests.
Figure 2B:
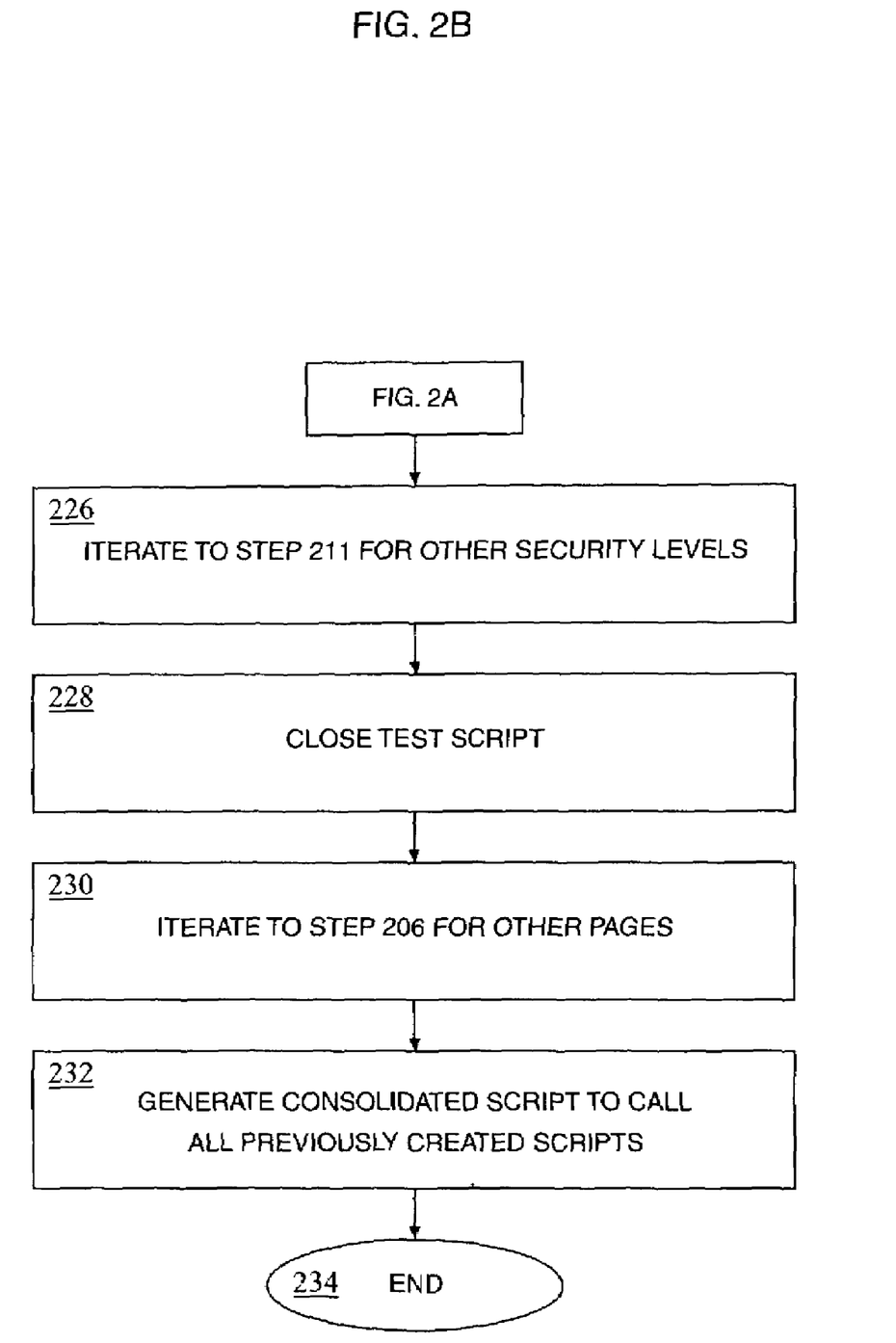
FIG. 2B is a flow diagram that illustrates additional steps in the method of FIG. 2A.
Figure 3:
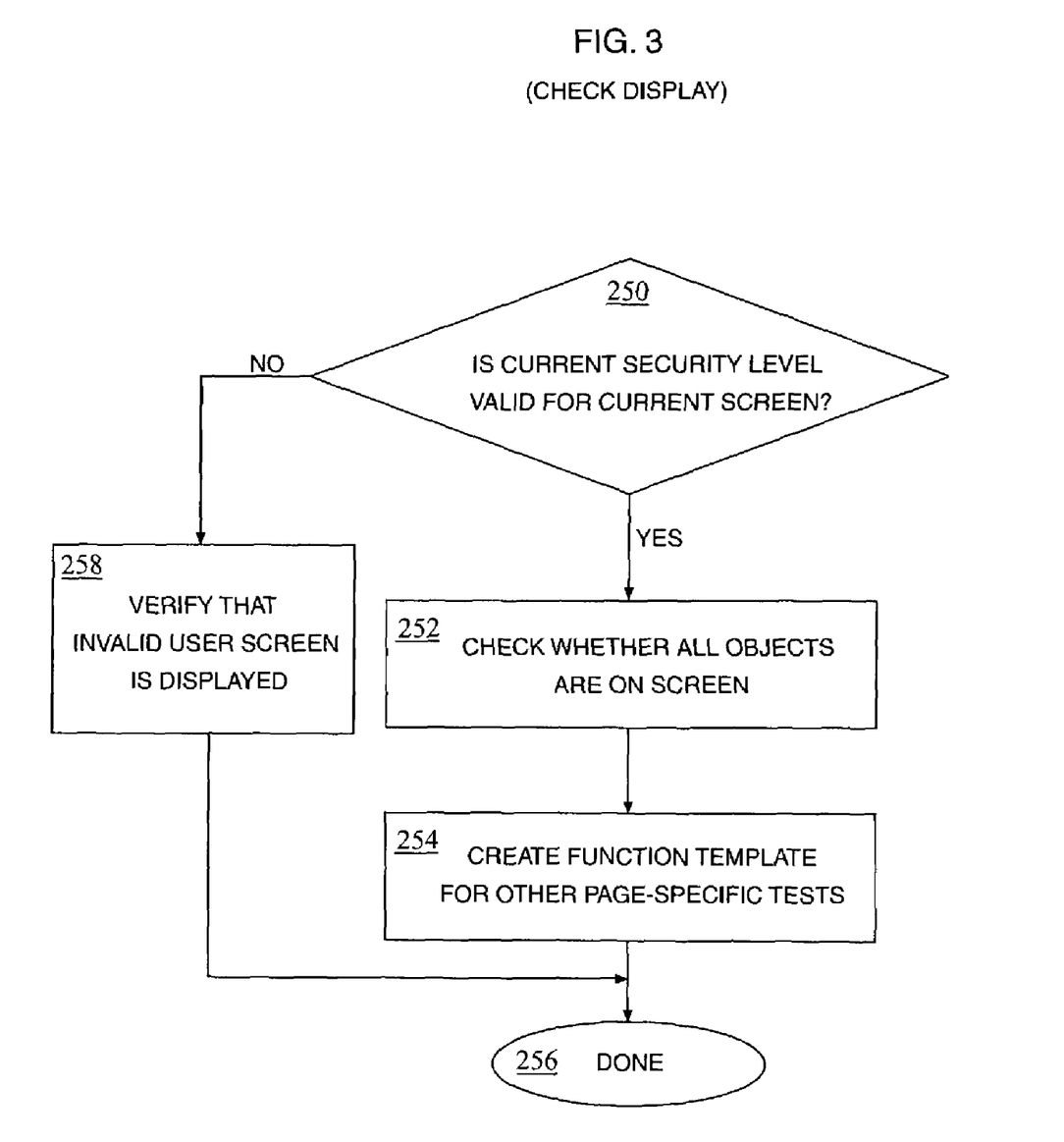
FIG. 3 is a flow diagram that illustrates one embodiment of a method for verifying a screen display, as part of the method of FIG. 2A.

An approach for using the system of FIG. 1B to automatically generate software application tests is now described with reference to FIG. 2A, FIG. 2B, and FIG. 3. FIG. 2A is a flow diagram that illustrates one embodiment of a method for automatically generating user interface tests. FIG. 2B is a flow diagram that illustrates additional steps in the method of FIG. 2A. FIG. 3 is a flow diagram that illustrates one embodiment of a method for verifying a screen display, as part of the method of FIG. 2A. For purposes of illustrating a clear example, the processes of FIG. 2A, FIG. 2B, and FIG. 3 are described with reference to the system of FIG. 1B; however, embodiments are not limited to the specific system of FIG. 1B, and any functionally equivalent system may be used.

Referring first to FIG. 2A, in block 202, a description of a page hierarchy is received. For example, automatic test generator 150 receives definition 104; in a specific embodiment, this may involve reading an XML file that contains definition 104. In block 204, the description of the page hierarchy is parsed. Parsing may involve using parser 152 to determine a screen identifier value, hierarchical location, and security attribute associated with each page of an application defined in definition 104. An example of parser 152 is provided in Appendix 4.

In block 206, the next page in the page hierarchy of the application under test is determined. Block 206 thus represents an initiation point for a programmatic loop that evaluates each page of the application, as represented by each leaf node described in a hierarchical tree in definition 104.

In block 208, for the then-current page, a test script is created. In the subsequent steps of block 210 through block 224, specific test script instructions or code is added to the test script. In one embodiment, testing system 170 of FIG. 1B is WinRunner, from Mercury Interactive, and each test script created in block 208 through block 224 contains one or more instructions in Mercury Interactive's Test Script Language (TSL). Alternatively, testing system 170 is RobotJ, from Rational Software, Inc., and each test script created in block 208 through block 224 is contains one or more instructions in the JAVA® language. In this description, the term "test script code" includes TSL, JAVA, and any other language or format for defining a test.

In block 210, test script code is generated to set the then-current security level to the lowest level that the application under test allows. In one embodiment, the lowest allowable security level is known independently of the system of FIG. 1B, and hard-coded into automatic test generator 150. Alternatively, metadata relating to the application under test, is stored in a computer-accessible source and retrieved by automatic test generator 150 when it is needed. For example, such metadata could form part of definition 104, or a separate description file. The metadata can define, for example, labels and variable names such as "Screen ID" and what they mean, the lowest allowable security level, etc. Further alternatives are described below in the section entitled "Extensions and Alternatives."

Block 211 represents initiation of a loop in which the steps of block 212 to block 224, inclusive, are iterated for each security level that is recognized by the application under test. In block 212, the test script logs on to the application. In block 214, the test script issues simulated mouse clicks that navigate to and display the then current page. In block 216, a check of the then-current screen display is performed. In one embodiment, the steps of FIG. 3 are performed; FIG. 3 is described further below.

In block 218, the test script issues simulated menu acceleration commands to navigate to and display the same page. In block 220, a check of the then-current screen display is again performed, for example, using the steps of FIG. 3. In block 222, the test script displays the same page by issuing a direct screen display call. For example, the test script code generated as part of block 222 may cause the test script to call bookmarking function 122 of runtime engine 120, providing a screen identifier as a parameter. In response, runtime engine 120 causes the application output 130 to represent the requested screen. In block 224, a third check display operation is performed.

Referring now to FIG. 2B, in block 226 control iterates to block 211 for consideration of the next security level. If all security levels have been checked using the process of block 212 to block 224, then control passes to block 228 in which the test script is closed or completed. In block 230, control iterates to block 206 to perform the foregoing process for the next page of the application under test, and eventually for all pages. If code has been generated for all pages in the application as described in the definition 104, then control continues at block 232.

In block 232, optionally, a consolidated script is created to call all previously created scripts for pages in the application. For example, in one specific embodiment, a script file in the format used by a TestCafe application is created. The TestCafe script provides a way to manage, call, and monitor results for a plurality of individual page scripts. TestCafe is a test framework tool that has been internally developed by Cisco Systems, Inc.

Referring now to FIG. 3, logic for a display check process is shown. The process of FIG. 3 is invoked at block 216, 220, and block 224 of FIG. 2A to check the on-screen output generated by the application under test for a particular page.

In block 250, a test is performed to determine if the then-current security level is valid for the current screen. In one embodiment, the test of block 250 involves comparing the then-current security level, to a minimum security level associated with the current page. The minimum security level associated with the current page is determined by parsing definition 104 to identify a security level value for each page. In the examples given herein, the TaskID tag identifies a minimum security level value for each page.

If the current security level is invalid, then control passes to block 258, in which the system verifies that an "invalid user" screen, or the equivalent, has been displayed. Processing then completes at block 256. Alternatively, if the current security level is valid, then in block 252, test script code checks whether all objects in the screen are present on the screen. Block 252 uses native functions of applications such as WinRunner or RobotJ to determine whether objects are present. The objects that are expected to form part of a screen are determined by WinRunner or RobotJ by parsing a description of the screen that is separately provided, to result in creating and storing a tree of objects in memory.

In block 254, a function template is created in the test script code for other page-specific tests. Block 254 provides a way to link hard-coded, manually created tests that are specific to a particular page into the test script. This enables a test engineer or other user to include code to test other aspects of the program under test, including aspects other than the GUI. In one embodiment, block 254 involves creating a function template for testing system 170, in which the then-current screen identifier is used as a name for the template. The function template may be filled with separately created test code thereafter. In block 256, processing is complete. For example, control returns to a section of test code that called the process of FIG. 3.

The test script that results from the foregoing processes may be used as a framework for more complete, application-specific testing. Unlike prior approaches, there is no separate process needed to generate such a framework.

Appendix 2 to this description presents a complete site map XML file example, including all required tags and attributes. Appendix 3 to this description presents an example implementation. Appendix 4 presents a JAVA parser implementation. Based on the structure of the XML registry file shown in Appendix 3, the JAVA code of Appendix 4 was written to parse the XML files and generate test scripts formatted in WinRunner Test Scripting Language ("TSL") that test the behavior of the tasks specified in the XML file. Appendix 5 presents an example of WinRunner test script code that was automatically generated.

The example of Appendices 2, 3, 4, and 5 does not use the example XML tags specified above with reference to definition 104. Instead, the example uses XML files associated with CiscoWorks 2000 Common Management Framework ("CMF"), from Cisco Systems, Inc. As in the case of definition 104 described above, the CMF XML files control web page navigation and security. The tags and semantics of the CMF registry files are used to parse the XML file of a specific application within the Campus Manager product, and transform it into an automated test for that application. Examples of the CMF XML tags used in the appendices are MENU, MENUBAR, and TOOLBAR.

3.0 Implementation Mechanisms—Hardware Overview

Figure 4:
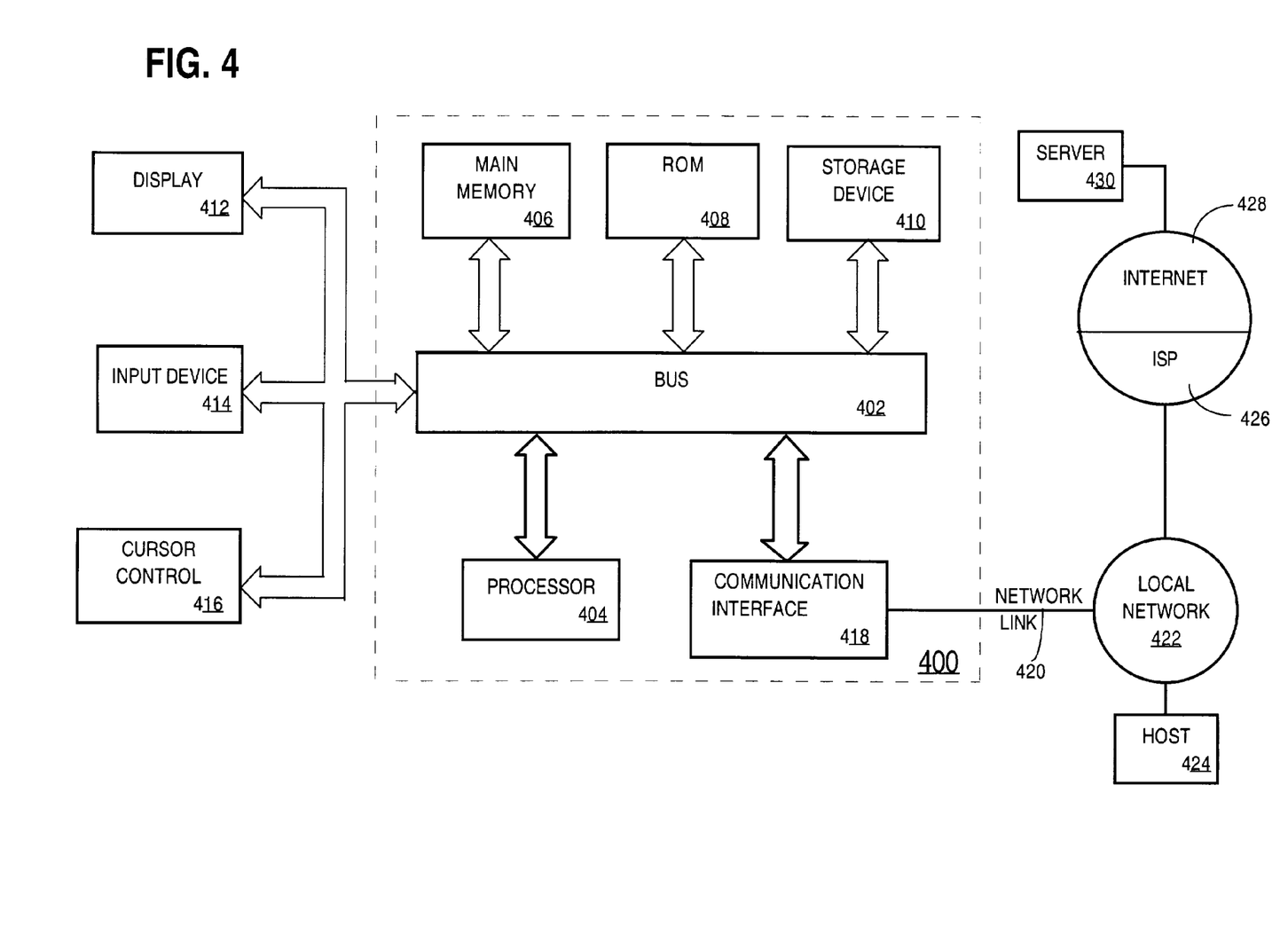
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for generating tests based on software product contents. According to one embodiment of the invention, generating tests based on software product contents is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for generating tests based on software product contents as described herein.

The received code may be executed by processor 404 as it is received, and/or stored in storage device 410, or other non-volatile storage for later execution. In this manner, computer system 400 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The foregoing example embodiments are illustrated in the context of user interface testing with an XML DTD having tags that relate to user interface structure, and a runtime engine that provides a bookmarking function. One example using XML page hierarchy output from the Site Map tool of the Cisco UII is given, and another example uses XML semantics associated with CMF. However, alternative embodiments may operate in the context of testing any other aspect of a program that is capable of description in any form of metadata.

In one alternative, applicable to JAVA code, information necessary to develop test programs for the methods of a class is provided in the "javadoc" documentation that is associated with the class. The "javadoc" documentation contains information about all methods that are exposed, as well as an acceptable range of values for parameters and all possible return codes. Test programs for these methods may be automatically generated to test valid and invalid range processing, and to generate of all possible error codes. Further, information about all methods that are exposed could also be derived by inspection of the classes.

A set of metadata that defines alternative tags, and a mapping of the alternative tags to the tags of the XML DTD defined herein, may drive operation of the parser and permit automatic generation of tests. Thus, the semantics of the tags defined herein may be mapped to different tags that are intended for use with a different application or framework. Accordingly, the parser and automatic test generator herein are extensible, and the techniques herein are applicable to any programming framework that provides a metadata description of a program or interface.

Further, the approaches herein may be used with applications other than Web-based applications. For example, a network device operating system could include a metadata file that describes the command set for the operating system. The parser and automatic test generator described herein may receive such a metadata file and automatically generate network device operating system tests. As a specific example, assume that each executable image of the Cisco Internetworking Operating System (IOS) contains a readable file that defines all Command Line Interface (CLI) commands supported by that image, and a definition of the semantics of the CLI commands. Test generator 150 reads the file and generates a test program that dispatches one or more CLI commands to a network device that is executing the IOS image. The order of the CLI commands may be determined by an evaluation of semantics of the CLI.

What is claimed is:

1. A method of automatically generating tests, the method comprising:

receiving a definition for a set of application pages, wherein the definition comprises an ordering of how the application pages appear in a hierarchical menu system and is written in a first language, and wherein each page in the set of application pages is written in a second language and is one visual display among a plurality of visual displays that form a page hierarchy; wherein the definition is a file;

parsing the definition to determine one or more page attributes associated with each page in the set of application pages, wherein the one or more page attributes comprise a screen identifier, hierarchy location, or a security level, and wherein the screen identifier, hierarchy location, or security level are associated with the each page in the set of application pages; and automatically generating a plurality of test scripts in a third language, wherein the plurality of test scripts, when executed by a testing system, cause the testing system to perform the steps of:

placing the set of application pages under test;

using the one or more page attributes to navigate through the set of application pages;

displaying an output for each application page in the set of application pages;

determining whether the output for each application page is properly displayed; and generating an indication of whether the output for each application page is properly displayed.

2. A method as recited in claim 1, wherein the test scripts, when executed by the testing system, further cause the testing system to perform the steps of:

for each user security level of a plurality of user security levels allowed by the set of application pages:

logging into the set of application pages under the each user security level;

navigating through the page hierarchy and displaying each page;

determining whether the each page is properly displayed based on the each user security level; and generating an indication of whether the each page is properly accessed based on the each user security level.

3. A method as recited in claim 2, wherein the test scripts, when executed by the testing system, further cause the testing system to perform the steps of:

determining whether the each user security level is valid for the each page;

determining whether an invalid user screen is displayed when the each user security level is invalid for the each page.

4. A method as recited in claim 2, wherein the test scripts, when executed by the testing system, further cause the testing system to perform the step of determining whether all screen objects of the each page are displayed.

5. A method as recited in claim 1, wherein the test scripts, when executed by the testing system, further cause the testing system to perform the steps of:

navigating through the page hierarchy and displaying each page using a plurality of different navigation mechanisms;

determining whether the each page is properly displayed after navigation using the plurality of different navigation mechanisms.

6. A method as recited in claim 1, wherein the test scripts, when executed by the testing system, further cause the testing system to perform the steps of:

navigating through the page hierarchy and displaying each page using a plurality of different navigation mechanisms, wherein the navigation mechanisms are selected from among: navigating and displaying using mouse clicks; navigating and displaying using menu acceleration keys; and navigating and displaying using a direct screen display call;

determining whether the each page is properly displayed after navigation using the plurality of different navigation mechanisms.

7. A method as recited in claim 1, wherein the parsing step further includes identifying a screen identifier value that is uniquely associated with each page, and wherein the step of navigating and displaying using a direct screen display call comprises the step of navigating and displaying a page by requesting a URL associated with the set of application pages and including the screen identifier value.

8. A method as recited in claim 1, wherein the parsing step further includes identifying a screen identifier value that is uniquely associated with each page, and wherein the step of navigating and displaying using a direct screen display call comprises the step of navigating and displaying a page by requesting a URL associated with the set of application pages and including the screen identifier value, using a bookmarking function of a runtime engine that controls execution of the program.

9. A method as recited in claim 1, wherein the testing system is Mercury Interactive WinRunner, and wherein the third language is Test Script Language.

10. A method as recited in claim 1, wherein the testing system is RobotJ, and wherein the third language is JAVA.

11. A method as recited in claim 1, wherein the definition comprises an Extensible Markup Language (XML) document that conforms to a Document Type Definition (DTD) comprising tags that define menu levels, menu level entries, screen identifiers, and security levels of the set of application pages.

12. A computer-readable storage medium carrying one or more sequences of instructions for automatically generating tests, which instructions, when executed by one or more processors, cause the one or more processors to carry out the steps of:

receiving a definition for a set of application pages, wherein the definition comprises an ordering of how the application pages appear in a hierarchical menu system and is written in a first language, and wherein each page in the set of application pages is written in a second language and is one visual display among a plurality of visual displays that form a page hierarchy; wherein the definition is a file;

parsing the definition to determine one or more page attributes associated with each page in the set of application pages, wherein the one or more page attributes comprise screen identifier, hierarchy location, or a security level and wherein the screen identifier, hierarchy location, or security level are associated with the each page in the set of application pages; and automatically generating a plurality of test scripts in a third language, wherein the plurality of test scripts, when executed by a testing system, cause the testing system to perform the steps of:

placing the set of application pages under test;

using the one or more page attributes to navigate through the set of application pages;

displaying an output for each application page in the set of application pages;

determining whether the output for each application page is properly displayed; and generating an indication of whether the output for each application page is properly displayed.

13. A computer-readable storage medium as recited in claim 12, wherein the test scripts, when executed by the testing system, further cause the testing system to perform the steps of:

for each user security level of a plurality of user security levels allowed by the set of application pages:

logging into the set of application pages under the each user security level;

navigating through the page hierarchy and displaying each page;

determining whether the each page is properly displayed based on the each user security level; and generating an indication of whether the each page is properly accessed based on the each user security level.

14. A computer-readable storage medium as recited in claim 13, wherein the test scripts, when executed by the testing system, further cause the testing system to perform the steps of determining whether all screen objects of the then-current page are displayed.

15. A computer-readable storage medium as recited in claim 12, wherein the test scripts, when executed by the testing system, further cause the testing system to perform the steps of:

navigating through the page hierarchy and displaying each page using a plurality of different navigation mechanisms;

determining whether the each page is properly displayed after navigation using the plurality of different navigation mechanisms.

16. A computer-readable storage medium as recited in claim 12, wherein the test scripts, when executed by the testing system, further cause the testing system to perform the steps of:

navigating through the page hierarchy and displaying each page using a plurality of different navigation mechanisms, wherein the navigation mechanisms are selected from among: navigating and displaying using mouse clicks; navigating and displaying using menu acceleration keys; and navigating and displaying using a direct screen display call;

determining whether the each page is properly displayed after navigation using the plurality of different navigation mechanisms.

17. A computer-readable storage medium as recited in claim 12, the parsing step further includes identifying a screen identifier value that is uniquely associated with each page, and wherein the step of navigating and displaying using a direct screen display call comprises the step of navigating and displaying a page by requesting a URL associated with the set of application pages and including the screen identifier value.

18. A computer-readable storage medium as recited in claim 12, wherein the parsing step further includes identifying a screen identifier value that is uniquely associated with each page, and wherein the step of navigating and displaying using a direct screen display call comprises the step of navigating and displaying a page by requesting a URL associated with the set of application pages and including the screen identifier value, using a bookmarking function of a runtime engine that controls execution of the program.

19. A computer-readable storage medium as recited in claim 12, wherein the test scripts, when executed by the testing system, further cause the testing system to perform the steps of:
  determining whether the each user security level is valid for the each page;
  determining whether an invalid user screen is displayed when the each user security level is invalid for the then each page.

20. A computer-readable storage medium as recited in claim 12, wherein the testing system is Mercury Interactive WinRunner, and wherein the third language is Test Script Language.

21. A computer-readable storage medium as recited in claim 12, wherein the testing system is RobotJ, and wherein the third language is JAVA.

22. A computer-readable storage medium as recited in claim 12, wherein the definition comprises an Extensible Markup Language (XML) document that conforms to a Document Type Definition (DTD) comprising tags that define menu levels, menu level entries, screen identifiers, and security levels of the set of application pages.

23. An apparatus for generating user interface tests for a software program based on metadata describing the program, comprising:
  a network interface that is coupled to the data network for receiving one or more packet flows therefrom;
  a processor;
  one or more stored sequences of instructions which, when executed by the processor, cause the processor to carry out the steps of:
  receiving a definition for a set of application pages, wherein the definition comprises an ordering of how the application pages appear in a hierarchical menu system and is written in a first language, and wherein each page in the set of application pages is written in a second language and is one visual display among a plurality of visual displays that form a page hierarchy;
  wherein the definition is a file;
  parsing the definition to determine one or more page attributes associated with each page in the set of application pages, wherein the one or more page attributes comprise screen identifier, hierarchy location, or a security level and wherein the screen identifier, hierarchy location, or security level are associated with the each page in the set of application pages; and
  automatically generating a plurality of test scripts in a third language, wherein the plurality of test scripts, when executed by a testing system, cause the testing system to perform the steps of:
    placing the set of application pages under test;
    using the one or more page attributes to navigate through the set of application pages;
    displaying an output for each application page in the set of application pages;
    determining whether the output for each application page is properly displayed; and
    generating an indication of whether the output for each application page is properly displayed.

24. An apparatus as recited in claim 23, wherein the test scripts, when executed by the testing system, further cause the testing system to perform the steps of:
  for each user security level of a plurality of user security levels allowed by the set of application pages:
    logging into the set of application pages under the each user security level;
    navigating through the page hierarchy and displaying each page;
    determining whether the each page is properly displayed based on the each user security level; and
    generating an indication of whether the each page is properly accessed based on the reach user security level.

25. An apparatus as recited in claim 24, wherein the test scripts, when executed by the testing system, further cause the testing system to perform the step of determining whether all screen objects of the each page are displayed.

26. An apparatus as recited in claim 23, wherein the test scripts, when executed by the testing system, further cause the testing system to perform the steps of:
  navigating through the page hierarchy and displaying each page using an plurality of different navigation mechanisms;
  determining whether the each page is properly displayed after navigation using the plurality of different navigation mechanisms.

27. An apparatus as recited in claim 23, wherein the parsing step further includes means for identifying a screen identifier value that is uniquely associated with each page, and wherein the step of navigating and displaying using a direct screen display call comprises the step of navigating and displaying a page by requesting a URL associated with the set of application pages and including the screen identifier value.

28. An apparatus as recited in claim 23, wherein the definition comprises an Extensible Markup Language (XML) document that conforms to a Document Type Definition (DTD) comprising tags that define menu levels, menu level entries, screen identifiers, and security levels of the set of application pages.

29. An apparatus for generating user interface tests, comprising:
  means for receiving a definition for a set of application pages, wherein the definition comprises an ordering of how the application pages appear in a hierarchical menu system and is written in a first language, and wherein each page in the set of application pages is written in a second language and is one visual display among a plurality of visual displays that form a page hierarchy;
  wherein the definition is a file;
  means for parsing the definition to determine one or more page attributes associated with each page in the set of application pages, wherein the one or more page attributes comprise screen identifier, hierarchy location, or a security level, and wherein the screen identifier, hierarchy location, or security level are associated with the each page in the set of application pages; and
  means for automatically generating a plurality of test scripts in a third language, wherein the plurality of test scripts, when executed by a testing system, cause the testing system to perform the steps of:
    placing the set of application pages under test;
    using the one or more page attributes to navigate through the set of application pages;
    displaying an output for each application page in the set of application pages;
    determining whether the output for each application page is properly displayed; and
    generating an indication of whether the output for each application page is properly displayed.

30. An apparatus as recited in claim 29, wherein the test scripts, when executed by the testing system, further cause the testing system to perform the steps of:
  for each user security level of a plurality of user security levels allowed by the set of application pages:
    logging into the set of application pages under the each user security level;
    navigating through the page hierarchy and displaying each page;
    determining whether the each page is properly displayed-based on the each user security level; and
    generating an indication of whether the each page is properly accessed based on the each user security level.

31. An apparatus as recited in claim 29, wherein the test scripts, when executed by the testing system, further cause the testing system to perform the steps of:
  navigating through the page hierarchy and displaying each page using a plurality of different navigation mechanisms;
  determining whether the each page is properly displayed after navigation using the plurality of different navigation mechanisms.

32. An apparatus as recited in claim 29, wherein the means for parsing further includes means for identifying a screen identifier value that is uniquely associated with each page, and wherein the means for navigating and displaying using a direct screen display call comprises the means for navigating and displaying a page by requesting a URL associated with the set of application pages and including the screen identifier value.

33. An apparatus as recited in claim 29, wherein the test scripts, when executed by the testing system, further cause the testing system to perform the step of determining whether all screen objects of the then-current page are displayed.

34. An apparatus as recited in claim 29, wherein the definition comprises an Extensible Markup Language (XML) document that conforms to a Document Type Definition (DTD) comprising tags that define menu levels, menu level entries, screen identifiers, and security levels of the set of application pages.

* * * * *

UNITED STATES PATENT AND TRADEMARK OFFICE
CERTIFICATE OF CORRECTION

PATENT NO. : 7,272,822 B1  Page 1 of 1
APPLICATION NO. : 10/246340
DATED : September 18, 2007
INVENTOR(S) : Michael Riggins et al.

It is certified that error appears in the above-identified patent and that said Letters Patent is hereby corrected as shown below:

Claim 12, column 1, line 58: missing comma: "level" should read --level,--
Claim 14, column 2, line 25: "steps" should read --step--
Claim 14, column 2, line 26: "then-current page" should read --each page--
Claim 19, column 1, line 8: delete "then"
Claim 23, column 1, line 44: missing comma: "level" should read --level,--
Claim 24, column 2, line 6: should read --each-- not "reach"
Claim 27, column 2, line 22: delete "means for"

Signed and Sealed this

Twenty-fourth Day of June, 2008

JON W. DUDAS
*Director of the United States Patent and Trademark Office*